United States Patent [19]
Burkus et al.

[11] 3,892,713
[45] July 1, 1975

[54] CURE OF POLYURETHANES WITH MIXED CURATIVES COMPRISING HYDROXY TERTIARY AMINES

[75] Inventors: John Burkus, Woodbridge; Robert G. Leclerc, Wolcott; Louis V. Esposito, Naugatuck, all of Conn.

[73] Assignee: Uniroyal, Inc., New York, N.Y.

[22] Filed: Mar. 25, 1974

[21] Appl. No.: 454,646

[52] U.S. Cl.... 260/75 NC; 260/2.5 AC; 260/77.5 AC; 264/331
[51] Int. Cl............................................. C08g 22/38
[58] Field of Search...... 260/75 NH, 75 NP, 75 NC, 260/77.5 AM, 2.5 AC, 77.5 AC; 252/182

[56] References Cited
UNITED STATES PATENTS 3,044,971 7/1962 Polis.............................. 260/2.5 AC
3,476,933 11/1969 Mendelsohn.................. 260/2.5 AC

*Primary Examiner*—H. S. Cockerman
*Attorney, Agent, or Firm*—James J. Long

[57] ABSTRACT

Polyurethane prepolymers are cured with a mixture of
A. hydroquinone bis(beta-hydroxyethyl) ether, or
B. 1,4-butanediol, with,
C. phenyl diethanol amine, and
D. triisopropanol amine.

This curative mixture makes possible short molding times and good physical properties.

11 Claims, No Drawings

CURE OF POLYURETHANES WITH MIXED CURATIVES COMPRISING HYDROXY TERTIARY AMINES

This invention relates to a method of curing a polyurethane, a curative composition useful in such method, and a cured polyurethane produced by such method.

In one important aspect, the invention relates to the curing of liquid polyurethanes containing isocyanate end groups. Such polyurethanes are usually prepared by reacting an excess of an organic diisocyanate with a long-chain glycol. Generally the glycols used are polyether glycols or polyester glycols. The molar ratio of diisocyanate to glycol should be greater than one and is preferably large enough so that the polyurethane is liquid. Such liquid polyurethanes are generally called prepolymers.

Curing agents for these prepolymers are compounds which contain more than one active hydrogen-containing group capable of adding to the isocyanate group. Glycols and diamines are such compounds. Water can also be used; it functions by reacting with an isocyanate group to form a primary amino group. The plurality of the addition reactions results in chain extension. The ratio of reactants is usually chosen so that an excess of isocyanate groups is present. These react with active hydrogen-containing groups in the polymer chain (e.g., urethane groups), to give branch points which result in cross-links. See pp. 273–4, Polyurethanes:Chemistry and Technology. I. Chemistry by J. H. Saunders and K. C. Frisch, Interscience Publishers, 1962, for a description of the chemical reactions involved in the curing action.

Examples of curing agents (chain extenders) conventionally used are 4,4'-methylenebis(2-chloroaniline) 1,4-butanediol, and hydroquinone bis(2-hydroxyethyl) ether.

Unfortunately, the conventional curing agents suffer from various disadvantages. Thus, 4,4'-methylenebis 2-chloroaniline) is carcinogenic. Hydroquinone bis(-betahydroxyethyl) ether and 1,4-butanediol require long curing cycles and the vulcanizates are susceptible to stress formation and cracking; for a long period during the cure cycle the material has a cheezy texture. The long curing cycles required mean that molds cannot be recharged quickly and this places the fabricator at a great economic disadvantage. Phenyl diethanol amine and triisopropanol amine likewise require long curing and set times and generally yield elastomers that have low tensile properties and are not as hard as would be desirable for many applications.

In accordance with the invention, it has now been discovered, unexpectedly, that by curing the isocyanate terminated polyurethane prepolymer with a certain mixture of curatives, short curing cycles can surprisingly be achieved in combination with remarkable physical properties in the cured vulcanizate. The curative mixture employed in the invention is a blend of A. hydroquinone bis(beta-hydroxyethyl) ether, or B. 1,4-butanediol, with C. phenyl diethanol amine, and D. triisopropanol amine.

It will be understood that the ability to rotate molds, that is, the ability to demold and refill the mold, as rapidly as possible is of utmost importance to formulators processing castable polyurethane pieces. A short demold time allows a formulator to keep a minimum inventory of costly molds and still process a large volume of pieces. This short demold time represents a cost savings to the formulator and thus he becomes more cost-competitive.

When processing vulcanizates cured with hydroquinone bis(beta-hydroxyethyl) ether or 1,4-butanediol, a short demold times becomes a major problem. Vulcanizates cured with either hydroquinone bis(beta-hydroxyethyl) ether or 1,4-butanediol undergo a critical initial cure cycle stage during which the parts in the mold cannot be subjected to any stress because of the cheesy texture of the vulcanizate. During this cheesy stage the vulcanizate cannot be touched because the piece does not have any integrity or elastomeric quality. The vulcanizates can easily be deformed during the cheesy stage. If a part were demolded during this cheesy stage, an operator could easily deform it by dropping the piece or by putting a finger into the material.

As indicated, the invention is based on the surprising discovery that the addition of phenyl diethanol amine and triisopropanol amine to either hydroquinone bis(-beta-hydroxyethyl) ether or 1,4-butanediol alleviates this problem of a cheesy stage and long demold time. These novel curing systems allow formulators to rotate molds within a short period of time and thus become more cost competitive.

Cured pieces having optimum hardness and good tensile and other properties are obtained by the method of the invention.

As shown in Table I, (A) hydroquinone bis(beta-hydroxyethyl) ether, (B) 1,4-butanediol and a mixture of (C) phenyl diethanol amine with (D) triisopropanol amine have long demold times, but the addition of (C) phenyl diethanol amine and (D) triisopropanol amine to either (A) hydroquinone bis(beta-hydroxyethyl) ether or (B) 1,4-butanediol unexpectedly shortens the demold time by at least 50%, in a polyether prepolymer containing 6.5% available isocyanate.

Table I

| | Cure Time | |
|---|---|---|
| | Gel Formation Time (min) | Demold Time |
| (A) | 6 | 2 hrs.–30 min. |
| (B) | 5 | 60 min. |
| (C)/(D) | 15 | 3–4 hrs. |
| (A)/(C)/(D) | 9 | 75 min. |
| (B)/(C)/(D) | 5 | 30 min. |

For purposes of the invention, the weight ratio of (C) phenyl diethanol amine to (D) triisopropanol amine is suitably from 98:2 to 50:50 (preferably from 95:5 to 80:20). The equivalents ratio of (A) hydroquinone bis(beta-hydroxyethyl) ether to (C) plus (D) is suitably from 17:1 to 2.5:1 (preferably from 9:1 to 3.5:1). The equivalents ratio of (B) 1,4-butanediol to (C) plus (D) is suitably from 18:1 to 2.5:1 (preferably from 9:1 to 2.5:1).

It will be understood that the polyurethane prepolymers employed in the invention are conventional. As is well known to those skilled in this art such materials are produced from an organic compound rich in hydroxy groups, usually a polymer having at least two terminal hydroxy groups, frequently a polyether or polyester, and an organic polyisocyanate, usually a diisocyanate. The polymer used for reaction with the polyisocyanate to make the polyurethane is frequently a polyether or polyester glycol having a molecular weight of from 400 to 6,000, preferably in the 1,000–2,000 range. Mention may be made of chain extended polyesters made from a glycol (e.g., ethylene and/or propylene glycol) and a saturated dicarboxylic acid (e.g., adipic acid). Usually the starting glycol contains from 2 to 20 carbon atoms and the acid contains from 4 to 12 carbon atoms. Polyethylene adipate, polyethylene adipate-phthalate, polyneopentyl sebacate, etc. may be mentioned. Small amounts of tri-alcohols such as trimethylolpropane or trimethylolethane may be included. There may also be mentioned the polyethers, such as polypropylene glycol, polypropylene-ethylene glycol and polytetramethylene glycol. Among the suitable polyisocyanates may be mentioned m- and p-phenylene diisocyanates; toluene diisocyanate; p,p'-diphenylmethane diisocyanate; 3,3' C. (or dimethoxy-4,4,40 -biphenyl diisocyanate; 1,5-naphthylene diisocyanate; p,p',p'' - triphenylmethane triisocyanate; p-phenylene diisothiocyanate, etc. The isocyanate is of course used in amount at least equivalent to the hydroxyl groups in the starting polymer; larger quantities of diisocyanate favor formation of liquid prepolymer. Generally the molar ratio of diisocyanate to glycol is in the 1.2:1 to 3:1 range. For additional examples of suitable starting materials for making polyurethanes, reference may be had to the following: Otto Bayer in "Angewandte Chemie," A/59 (1947), No. 9, p. 294; U.S. Pat. No. 3,105,062, Graham and Gregg, Sept. 24, 1963. It will be understood that the present curative compositions may be used in the same proportions and under the same curing conditions as conventional curatives. Almost invariably the proportions of curative to prepolymer are such as to provide from about 0.5 to about 1.1 equivalents of reactive hydrogen per isocyanate equivalent in the prepolymer. The curative is blended with the liquid prepolymer and is then shaped, for example, cast, molded, spread on cloth or otherwise used to coat and/or impregnate. While in the desired shape the mixture is heated to expedite cure, for example, to a temperature of 50°–250° C. for ½–48 hours (time and temperature of cure being generally inversely related) depending on such factors as the particular prepolymer used, the amount of curative, the degree of cure desired, the size of the article, the character of the heating device, etc. In general, remarkably reduced curing times (demolding times) are made possible by the invention, at a given temperature for a given formulation and desired level of cure.

In many cases, preferred prepolymers are reaction products of p,p'-diphenylmethane diisocyanate and a polyether glycol or a polyester glycol, especially a polytetramethylene glycol having an hydroxyl number ranging from about 200 to 50, or a polyester glycol which is a reaction product of adipic acid with ethylene glycol/1,4-butylene glycol, 1,4-butylene glycol, or ethylene/1,3-propylene glycol with an hydroxyl number ranging from about 50 to 100. The isocyanate content of such polyurethane prepolymers frequently ranges from 10 to 3% by weight.

The following examples will serve to illustrate the practice of the invention in more detail.

EXAMPLE 1

The polyurethane prepolymer employed in this example was made from 100 parts of a polyester and 40.7 parts of MDI (p,p'-diphenylmethane diisocyanate). The polyester made from 60/40 ethylene/1,4-butylene glycol and adipic acid, hydroxyl number, e.g. 80, it was heated to 90°C and stripped under vacuum for one hour. The polyester was then cooled to 50°C and the MDI was charged while circulating cooling water in a jacket of the reaction vessel. The reaction was allowed to exotherm and then the reaction mass temperature was adjusted to 80°C and maintained at this temperature for two hours, to produce a prepolymer having an amine equivalent of 665 ± 25.

The prepolymer was mixed with curatives in the proportions (by weight) shown in Table II to make a series of curable mixtures identified as 1a through 1f. In Table II (B) stands for 1,4-butanediol, (C) stands for phenyl diethanol amine and (D) stands for triisopropanol amine. The prepolymer was heated to 200°F and the curatives were heated to 100°F and the mixtures were poured into open molds having dimensions of 6 by 6 by ¼ inches. The mixing time was 30 seconds, pour time 3 minutes. The curing temperature was 230°F. The gel formation time, peak time and set time were observed with the results shown in Table II. In addition, the texture was evaluated at 15 minute intervals to determine if the material was cheesy, according to the following three tests:
1. Pulling apart — if the vulcanizate could be pulled apart, it was classified as cheesy.
2. Bent loop — if the vulcanizate could be bent, and cracked, it was classified as cheesy.
3. Fold and press — if the vulcanizate could be folded over and broken with pressure, it was classified as cheesy.

Also, stress cracking was evaluated by bending the vulcanizate; if cracking occurred, it was not considered that the vulcanizate was a demoldable piece.

Ratings of 1 to 4 were assigned according to the following rating scale:
1. Pulls apart, cannot bend without cracking, stress marks present. Can take hardness reading.
2. Pulls apart, can bend, stress marks present, breaks when folded over and pressure applied.
3. Cannot pull apart, can bend, no stress marks present, breaks on folding over and pressure applied.
4. Cannot pull apart or break vulcanizate. Has elastomeric qualities.

Table II shows the rating results at 15 minute intervals, and also the final physical properties (24 hour cure). In Table II, the gel formation time, peak time and set time are expressed in minutes; the 100% and 200% modulus are expressed in psi, the tear is expressed as pli (die C) and the hardness as Shore A.

Table II

| Mixture | Cure of Polyester Based Prepolymer | | | | | |
| --- | --- | --- | --- | --- | --- | --- |
|  | 1a | 1b | 1c | 1d | 1e | 1f |
| Prepolymer | 100 | 100 | 100 | 100 | 100 | 100 |
| (B) curative | 6.7 | 6.3 | 6.0 | 5.6 | 5.2 | 4.9 |
| (C) curative | — | .64 | 1.19 | 1.83 | 2.47 | 3.12 |

Table II—Continued

| Mixture | Cure of Polyester Based Prepolymer | | | | | |
|---|---|---|---|---|---|---|
| | 1a | 1b | 1c | 1d | 1e | 1f |
| (D) curative | — | .058 | .108 | .165 | .224 | .280 |
| Equivalents ratio | | | | | | |
| (B):(C)/(D) | — | 17.7:1 | 9.0:1 | 5.46:1 | 3.75:1 | 2.80:1 |
| Gel time | 5 | 5 | 4 | 5 | 4.5 | 5 |
| Peak time | 6–8 | 6–8 | 6.5 | 7 | 7 | 6.5 |
| Set time | 10 | 12 | 11.5 | 12 | 10–13 | 10.5–12 |
| Ratings | | | | | | |
| 15 min | — | — | — | — | 1 | 1 |
| 30 min | 1 | 1 | 1 | 3 | 3 | 3 |
| 45 min | 2 | 2 | 3 | 4 | 4 | 4 |
| 60 min | 3 | 4 | 4 | 4 | 4 | 4 |
| Physical props. | | | | | | |
| 100% modulus | 800 | 700 | 600 | 600 | | |
| 300% modulus | 1900 | 1410 | 1600 | 1280 | | |
| Tear | 470 | 460 | 385 | 375 | | |
| Hardness | 80 | 77 | 72 | 73 | | |

EXAMPLE 2

In this example the polyurethane prepolymer employed was based on a polyether, polytetramethylene glycol of 2,000 molecular weight. 100 parts of the polyether was reacted with 40.7 parts of MDI according to the procedure of Example 1 to produce a prepolymer having an amine equivalent of 665 ± 25. Mixtures identified as 2a to 2f in Table III were prepared using as the curative (A) hydroquinone bis(beta-hydroxyethyl) ether, (C) phenyl diethanol amine and (D) 1,4-butanediol in the amounts shown in Table III. The mixtures were cast in molds and evaluated as in Example 1 with the results shown in Table III. The prepolymer temperature and curative temperature were 230°F, the cure cycle was 24 hours at 230°F. The mixing time was 30 seconds, and the pour times were as shown in Table III (in minutes). Table III also gives the time (in minutes) for start and finish of a color change in the mixture, as well as the peak time in minutes, and ratings (according to the rating scale described in Example 1) at various intervals. Final physical properties are shown in Table III, wherein the tensile strength is expressed in psi and the other properties are expressed as in Example 1.

Table III

| Mixture | Cure of Polyether Based Prepolymer | | | | | |
|---|---|---|---|---|---|---|
| | 2a | 2b | 2c | 2d | 2e | 2f |
| Prepolymer | 100 | 100 | 100 | 100 | 100 | 100 |
| (A) curative | 13.9 | 13.1 | 12.4 | 11.7 | 11.0 | 10.2 |
| (C) curative | — | .64 | 1.19 | 1.74 | 2.39 | 2.94 |
| (D) curative | — | .06 | .11 | .16 | .21 | .26 |
| Equivalents ratio | | | | | | |
| (A):(C)/(D) | — | 16.74:1 | 8.46:1 | 5.44:1 | 3.75:1 | 2.83:1 |
| Pour time | 2.5–3 | 3 | 3 | 2.5 | 3.5 | 2.5 |
| Color change | | | | | | |
| Start | 3–3.5 | 3.5 | 3.5 | 4 | 4 | 4.5 |
| Finish | 5–6 | 6.5 | 7.5 | 7 | 8 | 8.5 |
| Peak time | 6 | 6.5 | 8.5 | 9 | 9.5 | 10 |
| Ratings | | | | | | |
| 30 min | 1 | 1 | | | | |
| 45 min | 1 | 1 | 1 | 1 | 1 | 1 |
| 60 min | 2 | 2 | 2 | 3 | 3 | 3 |
| 75 min | 2 | 2 | 3 | 4 | 4 | 4 |
| 90 min | 2 | 2 | 3 | 4 | 4 | 4 |
| 2 hrs | 2 | 3 | 4 | 4 | 4 | 4 |
| 2 hrs. 30 min | 4 | | | | | |
| Physical props. | | | | | | |
| 100% modulus | 1580 | 1500 | 1450 | 1350 | | |
| 300% modulus | 2010 | 1900 | 1850 | 1740 | | |
| Tensile | 3900 | 3700 | 3700 | 3600 | | |
| Tear | 210 | 195 | 185 | 190 | | |
| Hardness | 91 | 90 | 91 | 92 | | |

We claim:

1. A method of curing an isocyanate terminated polyurethane prepolymer comprising admixing therewith, in amount sufficient to cure the prepolymer, (A) hydroquinone bis (beta-hydroxyethyl) ether or (B) 1,4-butanediol, with (C) phenyl diethanol amine and (D) triisopropanol amine, the ratio of (C) to (D) being from 98:2 to 50:50 by weight, the equivalents ratio of (A) to (C) plus (D) being from 17:1 to 2.5:1, and the equivalents ratio of (B) to (C) plus (D) being from 18:1 to 2.5:1, and subjecting the mixture to curing conditions.

2. A method as in claim 1 in which the ratio of (C) to (D) is from 95:5 to 80:20 by weight, the equivalents ratio of (A) to (C) plus (D) is from 9:1 to 3.5:1, and the equivalents ratio of (B) to (C) plus (D) is from 9:1 to 2.5:1.

3. A curative mixture for isocyanate terminated prepolymers comprising (A) or (B), with (C) and (D) as recited in claim 1.

4. The product of the method of claim 1.

5. A method of making shaped articles from a curable liquid polyurethane prepolymer having available isocyanate groups comprising admixing therewith, in amount sufficient to cure the prepolymer, a curative blend of (A) hydroquinone bis (beta-hydroxyethyl) ether or (B) 1,4with (C) phenyl diethanolamine and (D) triisopropanol amine, the ratio of (C) to (D) being from 98:2 to 50:50 by weight, the equivalents ratio of (A) to (C) plus (D) being from 17:1 to 2.5:1 and the equivalents ratio of (B) to (C) plus (D) being from 18:1 to 2.5:1, charging the mixture to a mold and subjecting to curing conditions to cure the mixture in a desired shape in the mold, whereby the mixture in the mold passes quickly through a cheesy stage to a stage wherein it has sufficiently high physical properties to be removed from the mold without damage or distortion.

6. A method as in claim 5 wherein the said prepolymer is a reaction product of a polytetramethylene glycol having an hydroxyl number from 200 to 50 and p,p'-diphenylmethane diisocyanate.

7. A method as in claim 6 wherein the curative is (A) plus (C) and (D), the ratio of (C) to (D) being from 95:5 to 80:20 by weight and the equivalents ratio of (A) to (C) plus (D) being from 9:1 to 3.5:1.

8. A method as in claim 6 wherein the curative is (B) plus (C) and (D), the ratio of (C) to (D) being from 95:5 to 80:20 by weight and the equivalents ratio of (B) to (C) plus (D) being from 90:1 to 2.5:1.

9. A method as in claim 5 wherein the said prepolymer is a reaction product of a glycol-adipic acid polyester having an hydroxyl number of 50 to 100 and p,p'-diphenylmethane diisocyanate.

10. A method as in claim 9 wherein the curative is (A) plus (C) and (D), the ratio of (C) to (D) being from 95:5 to 80:20 by weight and the equivalents ratio of (A) to (C) plus (D) being from 9:1 to 3.5:1.

11. A method as in claim 9 wherein the curative is (B) plus (C) and (D), the ratio of (C) to (D) being from 95:5 to 80:20 by weight and the equivalents ratio of (B) to (C) plus (D) being from 9:1 to 2.5:1.

* * * * *

UNITED STATES PATENT AND TRADEMARK OFFICE
CERTIFICATE OF CORRECTION

PATENT NO. : 3,892,713
DATED : July 1, 1975
INVENTOR(S) : John Burkus et al.

It is certified that error appears in the above-identified patent and that said Letters Patent are hereby corrected as shown below:

Column 7, line 12, for "1,4with" read -- 1,4-butanediol, with --.

Signed and Sealed this second Day of March 1976

[SEAL]

Attest:

RUTH C. MASON
Attesting Officer

C. MARSHALL DANN
Commissioner of Patents and Trademarks